E. A. FORSBERG.
FEED DEVICE FOR CENTRIFUGAL SEPARATORS.
APPLICATION FILED OCT. 11, 1906.
903,369.
Patented Nov. 10, 1908.
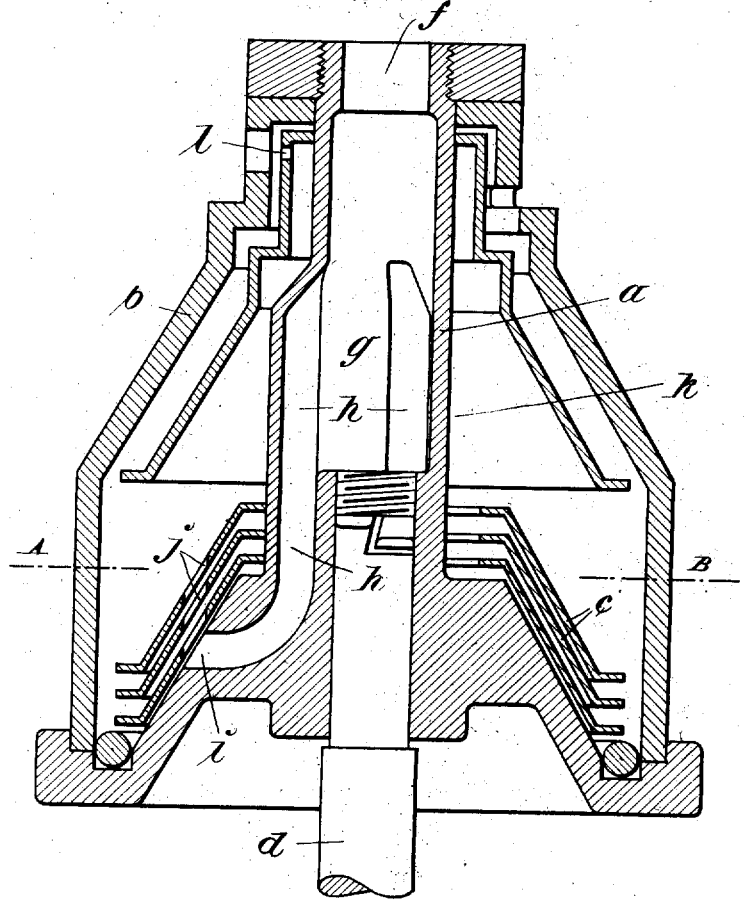
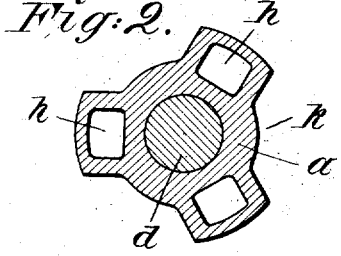
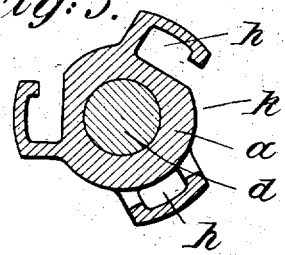
WITNESSES:
INVENTOR
ATTORNEYS.

UNITED STATES PATENT OFFICE.

ERIK AUGUST FORSBERG, OF STOCKHOLM, SWEDEN, ASSIGNOR TO AKTIEBOLAGET SEPARATOR, OF STOCKHOLM, SWEDEN.

FEED DEVICE FOR CENTRIFUGAL SEPARATORS.

No. 903,369.   Specification of Letters Patent.   Patented Nov. 10, 1908.

Application filed October 11, 1906.   Serial No. 338,442.

*To all whom it may concern:*

Be it known that I, ERIK AUGUST FORSBERG, a subject of the King of Sweden, and residing at Stockholm, Sweden, have invented certain new and useful Improvements in Feed Devices for Centrifugal Separators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In centrifugal machines for separating milk and cream it is usual to try to arrange the supply of the whole milk in such a manner, that it need not pass the cream layer for the purpose of preventing remingling. To attain this object, plates have, among other things, been used, said plates having holes lying in rows, and arranged between the outer and the inner edge of the plate, the whole milk being fed into the spaces between the plates of the liner through said rows of holes. It is quite advantageous to use bowls in which the bottom of the bowl is drawn up into the bowl to allow the top bearing to be lifted up, thus saving space and attaining a steadier running bowl.

The object of this invention is to produce a device, which enables the use of plates with holes therein in bowls in which the bottom of the bowl is drawn up into the bowl and to maintain the present simplicity of the different parts of the bowl.

The improvement is shown on the annexed drawing, wherein Figure 1 shows a centrifugal bowl in longitudinal section, Fig. 2 the central feed pipe in section on line A—B and Fig. 3 a modified form of the central feed pipe.

*a* designates the central feed pipe, *b* the cover, *c* the plates and *d* the spindle of the bowl. The whole milk enters at *f* and runs down into a chamber *g*, arranged above the spindle, whence channels *h* lead down to the openings *i*, which correspond to the holes *j* in the plates. The channels *h* do not take up the whole periphery of the central feed pipe, but leave passages *k* between them, through which the cream can ascend along the central feed pipe *a* to the discharge opening *l*. By dividing in this manner the space between the disks and the central feed pipe into separate compartments, lying side by side, of which some serve for leading down the whole milk and the others for leading up the cream, it will be possible to place in the space, which must always be left between the central feed pipe and the plates, all the channels which are necessary for the streaming of the liquid.

Fig. 3 shows a modified form of the above mentioned device, consisting therein, that the channels for the whole milk are open on the one or on both sides, but so that there is formed a part, which is cup-shaped inwardly, wherein the milk during its passage downward, is retained on account of the centrifugal force. The object of the open channels is to facilitate the cleansing.

Claims:

1. In a centrifugal milk separator, in combination, a bowl, superposed plates therein provided with orifices therethrough between their inner and outer ends, a central feed pipe, channels leading therefrom at a point above the inner edge of the bottom plate and terminating below said plates and in line with said orifices.

2. In a centrifugal milk separator, in combination, a bowl, superposed plates therein provided with orifices therethrough between their inner and outer ends, a central feed pipe, channels leading therefrom at a point above the inner edge of the bottom plate and terminating below said plates and in line with said orifices, said channels having an open side.

3. In a centrifugal milk separator, in combination, a bowl, superposed plates therein provided with orifices therethrough between their inner and outer ends, a central feed pipe, said feed pipe terminating above the inner edge of the bottom plate, channels leading therefrom and terminating below said plates in line with said orifices.

4. In a centrifugal milk separator, in combination, a bowl, superposed plates therein provided with orifices therethrough between their inner and outer ends, a central feed pipe, said feed pipe terminating above the inner edge of the bottom plate, channels leading therefrom and terminating below said plates in line with said orifices, said channels having an open side.

5. In a centrifugal milk separator, in combination, a bowl, superposed plates therein provided with orifices therethrough between their inner and outer ends, a central feed pipe, a chamber above the inner edge of the bottom plate in which said feed pipe terminates, channels leading from said chamber and terminating below said plates, and in line with said orifices.

6. In a centrifugal milk separator, in combination, a bowl, superposed plates therein provided with orifices therethrough between their inner and outer ends, a central feed pipe, a chamber, above the inner edge of the bottom plate, in which said feed pipe terminates, channels leading from said chamber and terminating below said plates and in line with said orifices, said channels having an open side.

7. In a centrifugal cream separator, in combination, a bowl, superposed plates therein, provided with orifices therethrough, between their inner and outer ends, a central feed pipe, ribs projecting therefrom, at a point above the inner edge of the bottom plate, said ribs being provided with channels terminating below said plates and in line with said orifices.

8. In a centrifugal cream separator, in combination, a bowl, superposed plates therein, provided with orifices therethrough, between their inner and outer edges, a central feed pipe, said feed pipe terminating above the inner edge of the bottom plate, projecting ribs from said feed pipe, said ribs being provided with channels leading from said feed pipe, and terminating below said plates in line with said orifices.

In testimony, that I claim the foregoing as my invention, I have signed my name in presence of two subscribing witnesses.

ERIK AUGUST FORSBERG.

Witnesses:
CARL FRIBERG,
ROBT. R. KITCHEL.